(12) United States Patent
Okaue et al.

(10) Patent No.: US 7,490,198 B2
(45) Date of Patent: Feb. 10, 2009

(54) DATA STORAGE APPARATUS THAT INCLUDES A PLURALITY OF NONVOLATILE MEMORIES IN WHICH NO DATA IS ERASED AFTER THE DATA STORAGE APPARATUS IS REMOVED FROM A HOST APPARATUS

(75) Inventors: Takumi Okaue, Tokyo (JP); Shigeo Araki, Tokyo (JP); Junko Sasaki, Tokyo (JP); Kenichi Nakanishi, Tokyo (JP)

(73) Assignee: Sony Corporation, Tokyo (JP)

( * ) Notice: Subject to any disclaimer, the term of this patent is extended or adjusted under 35 U.S.C. 154(b) by 759 days.

(21) Appl. No.: 10/499,646

(22) PCT Filed: Oct. 7, 2003

(86) PCT No.: PCT/JP03/12846

§ 371 (c)(1),
(2), (4) Date: Jun. 28, 2004

(87) PCT Pub. No.: WO2004/047111

PCT Pub. Date: Jun. 3, 2004

(65) Prior Publication Data

US 2005/0086433 A1    Apr. 21, 2005

(30) Foreign Application Priority Data

Nov. 15, 2002  (JP) .............................. 2002-332699
Jan. 8, 2003   (JP) .............................. 2003-002653

(51) Int. Cl.
    *G06F 12/00*    (2006.01)
(52) U.S. Cl. ........................ 711/115; 711/103; 711/154; 711/162; 711/E12.103
(58) Field of Classification Search ................ 711/103, 711/115, 154, 162, E12.103
    See application file for complete search history.

(56) References Cited

U.S. PATENT DOCUMENTS 5,786,885 A    7/1998   Satoh (Continued)

FOREIGN PATENT DOCUMENTS

EP    0 887 742 A2    12/1998

(Continued)

OTHER PUBLICATIONS

Patent Abstracts of Japan, JP 05-233439, Sep. 10, 1993.
Patent Abstracts of Japan, JP 03-283078, Dec. 13, 1991.

(Continued)

*Primary Examiner*—Reginald G Bragdon
*Assistant Examiner*—Mehdi Namazi
(74) *Attorney, Agent, or Firm*—Oblon, Spivak, McClelland, Maier & Neustadt, P.C.

(57) ABSTRACT

This invention provides a memory card (1) that is to be used as a storage medium in a host apparatus that can record and reproduce data. The memory card has a first memory (12-1), a second memory (12-2), a first switch (13) for changing over one memory to the other, and a second switch (14) for connecting and disconnecting an insertion/removal detecting terminal INS. The first and second switches work as a slide switch (6) provided on the housing is operated. The first switch has a contact for selecting the first memory, a contact for selecting the second memory, and a contact located between these two contacts, for selecting neither memory. The second switch connects the terminal INS to the ground while the first switch remains connected to the contact for selecting the first memory or the contact for selecting the second memory. The second switch opens the terminal INS while the first switch remains connected to the contact for selecting neither memory.

18 Claims, 13 Drawing Sheets

U.S. PATENT DOCUMENTS

| | | | |
|---|---|---|---|
| 5,901,049 A | | 5/1999 | Schmidt et al. |
| 6,075,723 A | * | 6/2000 | Naiki et al. ............ 365/185.03 |
| 6,173,899 B1 | * | 1/2001 | Rozin ......................... 235/492 |
| 6,996,636 B2 | * | 2/2006 | Hung et al. .................... 710/8 |
| 2002/0084332 A1 | | 7/2002 | Kondo et al. |
| 2005/0010699 A1 | * | 1/2005 | Hung et al. ................... 710/14 |

FOREIGN PATENT DOCUMENTS

| | | |
|---|---|---|
| EP | 1 117 066 A1 | 7/2001 |
| EP | 1 207 493 A1 | 5/2002 |
| JP | 104949/1985 | 7/1985 |
| JP | 63-103494 | 5/1988 |
| JP | 63-172389 | 7/1988 |
| JP | 05-233439 | 9/1993 |
| JP | 2002-101419 | 4/2002 |
| JP | 2002-183700 | 6/2002 |
| WO | WO 02/05102 A1 | 1/2002 |

OTHER PUBLICATIONS

"DC-yo 'Memory Card 4X' ni Hitaio no Soft ga Akirakani", (online), Oct. 28, 2000, Softbank Publishing Inc., [retrieval date Jan. 6, 2004], Internet, <URL: http://www.itmedia.co.jp/games/gsnews/0010/28/news02.html>.

"Memory Card 4X", [online], Sega Corp., [retrieval date Jan. 6, 2004], Internet, <URL: http://sega.jp/dc/hard/mc_4x.html>.

* cited by examiner

DATA STORAGE APPARATUS THAT INCLUDES A PLURALITY OF NONVOLATILE MEMORIES IN WHICH NO DATA IS ERASED AFTER THE DATA STORAGE APPARATUS IS REMOVED FROM A HOST APPARATUS

TECHNICAL FIELD

The present invention relates to a removable data storage apparatus to be removably inserted into a host apparatus that can record and reproduce data. More particularly, the invention relates to a memory card and a memory card system for recording data in memory cards.

This application is based upon and claims the benefit of priority from Japanese Patent Application No. 2002-332699, filed Nov. 15, 2002 and Japanese Patent Application No. 2003-002653, filed Jan. 8, 2003, the entire contents of which are incorporated herein by reference.

BACKGROUND ART

Removable small IC memories, called "memory cards," are known, each to be removably inserted into a data-recording and/or reproducing apparatus and used as a data storage medium that has a NAND-type flash memory. Such an IC memory is disclosed in Jpn. Pat. Appln. Laid-Open Publication No. 10-340575. The memory card disclosed in this publication can store various types of digital data, such as still-picture data, moving-picture data, audio data and music data. It is used as an external storage medium in host apparatuses such as mobile information terminals, desktop computers, notebook computers, mobile telephones, audio apparatuses, household appliance and the like.

In recent years, the development of NAND-type flash memories has progressed, rapidly increasing the storage capacity of the flash memory of this type. Hence, the storage capacity of each memory card incorporating the NAND-type flash memory has proportionally increased.

The memory card has its storage capacity limited in accordance with the file system employed for it. If the memory card incorporates a flash memory that has a storage capacity larger than its storage capacity thus limited, part of the storage capacity of the flash memory will be wasted. To use the flash memory to its full storage capacity, the memory card needs to use a new file system.

To use a memory card for which a new file system is used, the host apparatus must have its operation system changed, in most cases. A complex process needs to be performed to change the operation system of the host apparatus. This requires much labor and high cost.

If a memory card is to be provided, which has a storage capacity exceeding the capacity manageable by the conventional file system, it should be used in a host apparatus, without the necessity of changing the operating system of the host apparatus.

In managing the data recorded in a memory card, it may be convenient in some cases if the storage area of the memory card is divided into several regions and if each storage region is recognized as an independent device. For example, it is very convenient for the user if his work-related information and his private information are stored in two different devices (two storage regions), respectively.

As a memory card thus devised, there is known a switch-changeover memory card incorporating a plurality of flash memories that can be switched from one to another by operating an external changeover switch. Jpn. Pat. Appln. Laid-Open Publication No. 5-233439 discloses a memory card of this type. The storage regions of the switch-changeover memory card can be recognized as independent devices to the host apparatus that incorporates this memory card. The switch-changeover memory card can have a total storage capacity, or a single-package storage capacity, exceeding the upper limit that the conventional file system can manage.

Assume that the conventional switch-changeover memory card has been incorporated into the host apparatus. Then, the host apparatus cannot recognize the devices (i.e., the storage regions of the switch-changeover memory card) when the external switch is operated. In the worst case, the data stored is destroyed.

As long as the conventional switch-changeover memory card remains held in the host apparatus, the user cannot determine which flash memory is selected and used at present. The user must remove the memory card from the host apparatus and must check the switch in order to determine which storage region of the memory card is selected.

DISCLOSURE OF THE INVENTION

An object of the present invention is to provide a novel data storage apparatus that is free of the problems with the above-described conventional technique, more specifically a memory card and a system for recording data in memory cards.

Another object of the invention is to provide a removable data storage apparatus that can be removably incorporated in a host apparatus. The data storage apparatus has a plurality of storage regions which the host apparatus can recognize as independent devices and which can be switched from one to another when a switch is operated, as long as the apparatus remains held in the host apparatus.

Still another object of the invention is to provide a removable data storage apparatus that can be removably incorporated in a host apparatus. The data storage apparatus has a plurality of storage regions which the host apparatus can recognize as independent devices and which enables the user to determine which storage region has been selected by operating a switch, though the apparatus remains held in the host apparatus.

Another object of the invention is to provide a removable data storage apparatus that can be removably incorporated in a host apparatus. The data storage apparatus has a plurality of storage regions which the host apparatus can recognize as independent devices and in which the operating device (i.e., storage region) cannot be switched from one to another while data is being recorded or reproduced.

A data storage apparatus according to this invention is a removable data-storage apparatus that can be removably attached to a host apparatus. The apparatus has a plurality of nonvolatile memories and a plurality of contacts. The storage apparatus comprises: a first switch having a plurality of contacts, one of which is selected by the user to select the nonvolatile memory corresponding to the contact; a second switch having contacts, one of which is selected as the first switch is operated; an interface unit which supplies and receives data to and from the host apparatus while the data storage apparatus remains attached to the host apparatus; and a controller which operates in accordance with data transmitted through the interface unit and which writes and reads data into and from one nonvolatile memory means that has been selected by operating the first switch.

The interface unit has a detecting terminal that makes the host apparatus determine that the apparatus is attached to the host apparatus. The host apparatus determines that the apparatus is attached to it if the detecting terminal is connected to the ground, and that the apparatus is not attached to it if the detecting terminal is opened.

The first switch has a contact for selecting none of the nonvolatile memory means, at a midpoint between the contact for selecting one nonvolatile memory means and the contact for selecting another nonvolatile memory means. The second switch connects the detecting terminal to the ground while the first switch keeps selecting any one of the nonvolatile memory means, and opens the detecting terminal while the first switch keeps selecting none of the nonvolatile memory means.

In the data storage apparatus according to this invention, the first switch is operated to switch the operating nonvolatile memory from one to the other, making the host apparatus recognize the storage regions of the memories as independent devices. Further, the first switch has a fixed contact for selecting none of the nonvolatile memories. This fixed contact is provided between a fixed contact for selecting any one of the nonvolatile memories and a fixed contact for selecting any other of the nonvolatile memories. When the movable contact of the first switch is connected to either fixed contact for selecting a nonvolatile memory, the second switch connects the detecting terminal to the ground. When the movable contact of the first switch is connected to neither fixed contact for selecting a nonvolatile memory, the second switch opens the detecting terminal to the ground.

Another type of a data storage apparatus according to this invention is a removable data-storage apparatus, too, which can be removably attached to a host apparatus. The apparatus has a plurality of nonvolatile memories and a plurality of contacts. This storage apparatus comprises: a memory-changeover switch having a plurality of contacts, one of which is selected by the user to select the nonvolatile memory corresponding to the contact; an interface unit which supplies and receives data to and from the host apparatus while the data storage apparatus remains attached to the host apparatus; a controller which operates in accordance with data transmitted through the interface unit and which writes and reads data into and from one nonvolatile memory means that has been selected by operating the memory-changeover switch; and a display unit that shows the user which nonvolatile memory that has been selected by operating the memory-changeover switch.

In this data storage apparatus according to this invention, the memory-changeover switch is operated to switch the operating nonvolatile memory from one to the other, making the host apparatus recognize the storage regions of the memories as independent devices. In addition, the display unit shows the user which nonvolatile memory has been selected by operating the memory-changeover switch.

The other objects of the invention and the specific advantages achieved by the invention will be apparent from the embodiments that will be described below with reference to the drawings.

BEST MODE FOR CARRYING OUT THE INVENTION

A small removable IC memory apparatus according to this invention and a data-processing apparatus using this small IC memory apparatus as an external storage medium will be described, with reference to some embodiments of the invention.

In the following description, the small IC memory apparatus will be referred to as "memory card," and the data-processing apparatus to which the memory card is connected will be referred to as "host apparatus."

Figure 1:
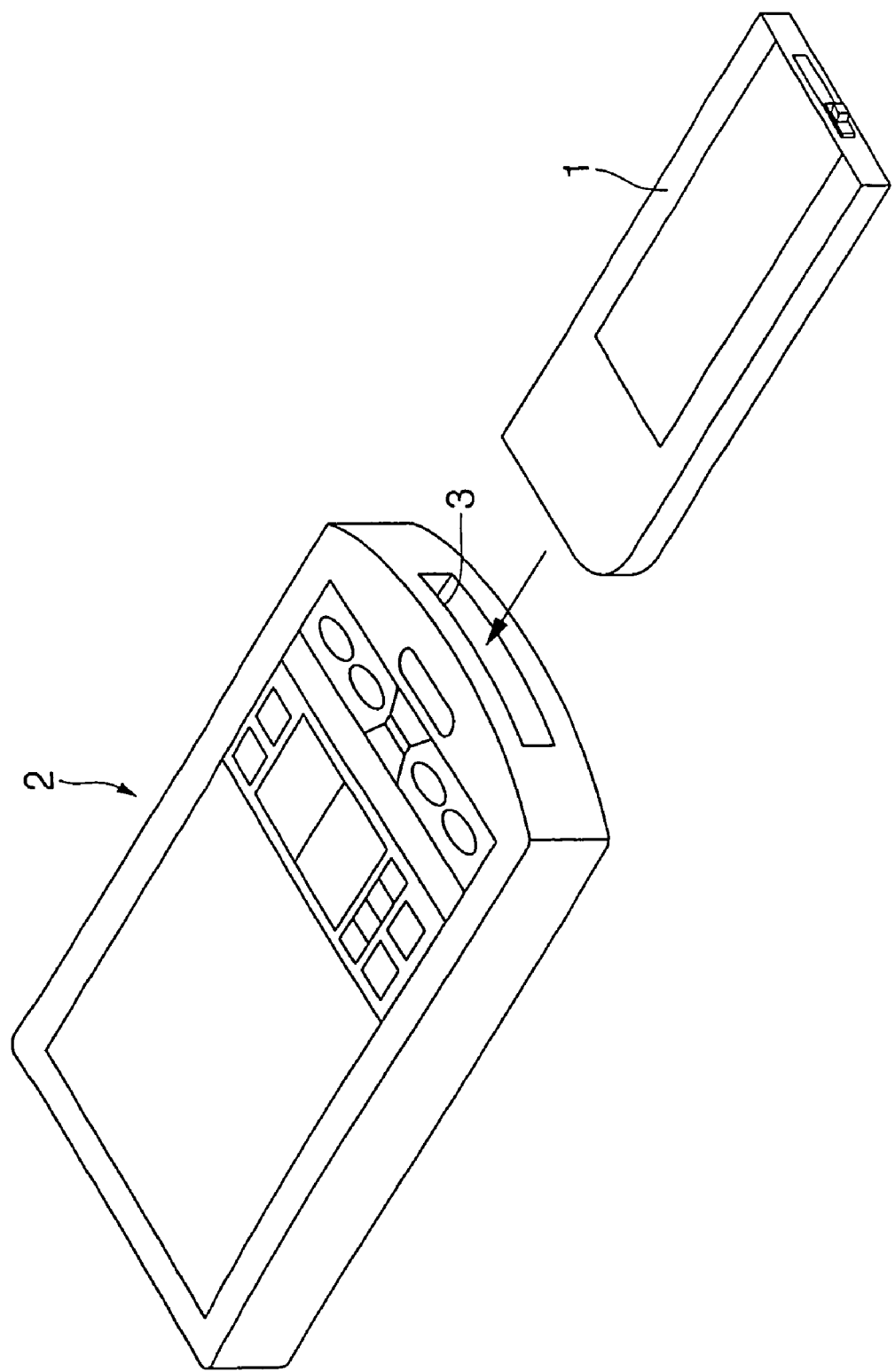
FIG. 1 is a perspective view showing a memory card according to the present invention, and a host apparatus for holding the memory card.

First, the host apparatus and the memory card connected to the host apparatus, both being embodiments of this invention, will be outlined with reference to FIG. 1.

The memory card 1 according to this invention incorporates nonvolatile semiconductor memories (IC memories). It can therefore store various types of digital data, such as still-picture data, moving-picture data, audio data and music data. The memory card 1 can work as an external storage medium in host apparatuses 2 such as mobile information terminals, desktop computers, notebook computers, mobile telephones, audio apparatuses, household appliance and the like.

As FIG. 1 shows, the memory card 1 is used after inserted into a host apparatus 2 through an insertion/removal port 3 that is made in one side of the apparatus 2. The user can freely insert and remove the memory card 1 into and from the host apparatus 2 through the insertion/removal port 3. The user can therefore pull the memory card 1 from the host apparatus 2 and inserted into any other host apparatus. Thus, the memory card 1 can be used to transfer data between different host apparatuses.

Figure 2:
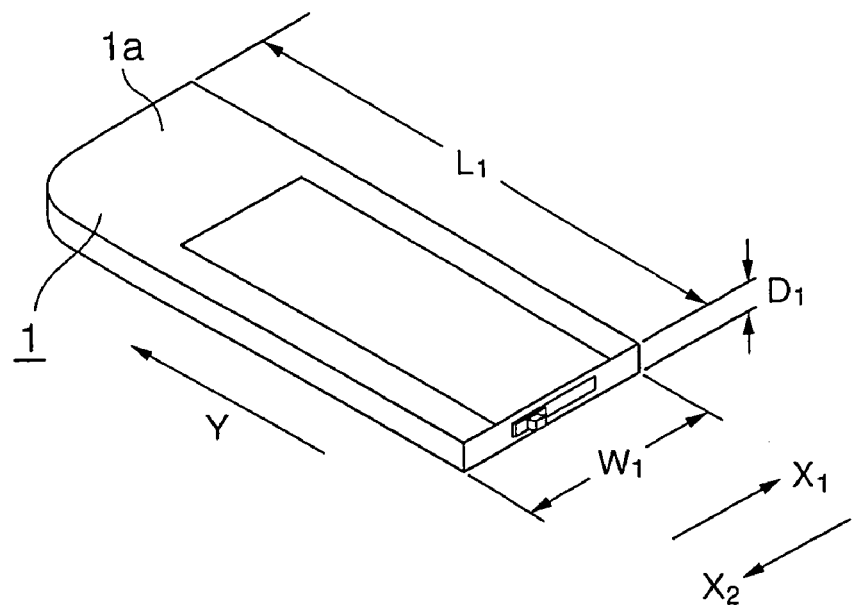
FIG. 2 is a perspective view depicting the memory card of this invention, as viewed from the obverse surface.
Figure 3:
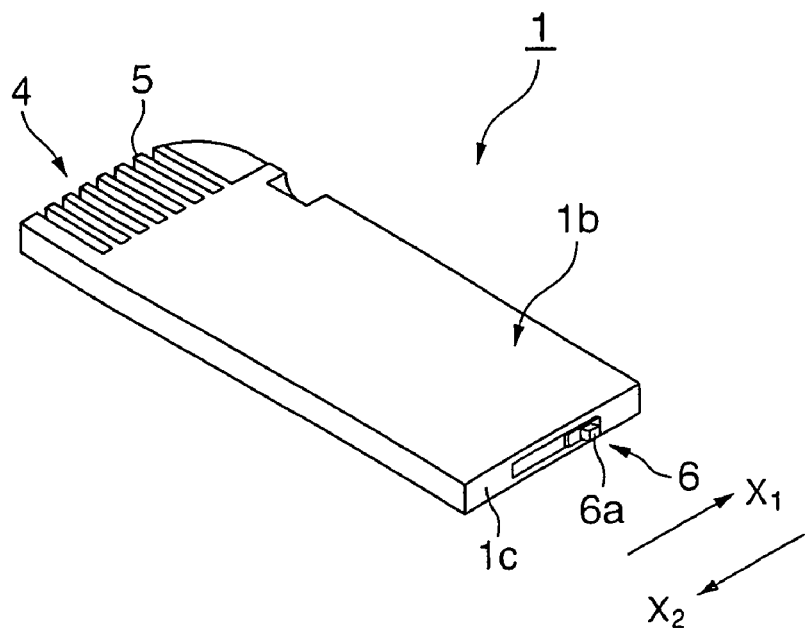
FIG. 3 is a perspective view showing the memory card as viewed from the reverse surface.

As FIG. 2 depicts, the memory card 1 according to the invention is shaped like a rectangular thin plate. It has a length L1 of 50 mm, a width W1 of 21.45 mm and a thickness D1 of 2.8 mm. Hereinafter, one surface of the memory card 1 shall be called "obverse surface 1*a*," and the other surface shall be called "reverse surface 1*b*." As FIG. 3 shows, the card 1 has a connection terminal unit 4 on its reverse surface 1*b*. The unit 4 is composed of ten flat electrodes, which are juxtaposed in the widthwise direction of the memory card 1. Partition strips 5 stand upright from the reverse surface 1*b* and are provided between the electrodes. Each partition strip 5 prevents adjacent the two connection terminals connected to any two adjacent electrodes, from contacting each other. As FIG. 3 illustrates, the memory card 1 has a slide switch 6. The slide switch 6 is provided on the center part of one end of the memory card 1 and is so positioned that the user can operates it even while the memory card 1 remains inserted in the host apparatus 2. More precisely, the slide switch 6 lies on the end 1*c* of the card 1, which faces away from the end on which the connection terminal unit 4 is provided. The end 1*c* remains exposed through the insertion/removal port 3 even if the memory card 1 is inserted in the host apparatus 2. Therefore, the user can operate the slide switch 6 from outside the host apparatus 2 while the memory card 1 remains held in the host apparatus 2.

The slide switch 6 has a movable part 6*a*. The movable part 6*a* can moved in directions X1 and X2. The slide switch 6 has three points at which the movable part 6*a* can be held. The first point is one end of the path in which the movable part 6*a* can move. The second point is the other end of this path. The third point is the midpoint of the path. Namely, the slide switch 6 can be moved from one point to another to switch one IC memory to another, which is incorporated in the memory card 1.

The host apparatus 2 has an insertion/removal port 3, through which the memory card 1 can be inserted into and removed from, the host apparatus 2. As FIG. 1 shows, the insertion/removal port 3 allows the passage of the memory card 1 that has width W1 and thickness D1. When the memory card 1 is inserted into the host apparatus 2 through the insertion/removal port 3, the electrodes of the connection terminal unit 4 are connected to the connection terminal unit that is provided in the host apparatus 2. Thus, the memory card 1 is held in the host apparatus 2, not slipping out of the host apparatus 2. The connection terminal unit of the host apparatus 2 has ten contacts that can receive the ten electrodes of the connection terminal unit 4, respectively.

To insert the memory card 1 into the host apparatus 2, the user holds the card 1 such that the connection terminal unit 4 faces the insertion/removal port 3. Then, the user moves the card 1 in direction Y (FIG. 2), thus inserting the card 1 into the apparatus 2 through the insertion/removal port 3. Once the memory card 1 thus inserted is held in the apparatus 2, the electrodes of the connection terminal unit 4 are connected to the contacts of the connection terminal unit that is provided in the host apparatus 2. Signals can then be exchanged between the memory card 1 and the host apparatus 2.

Figure 4:
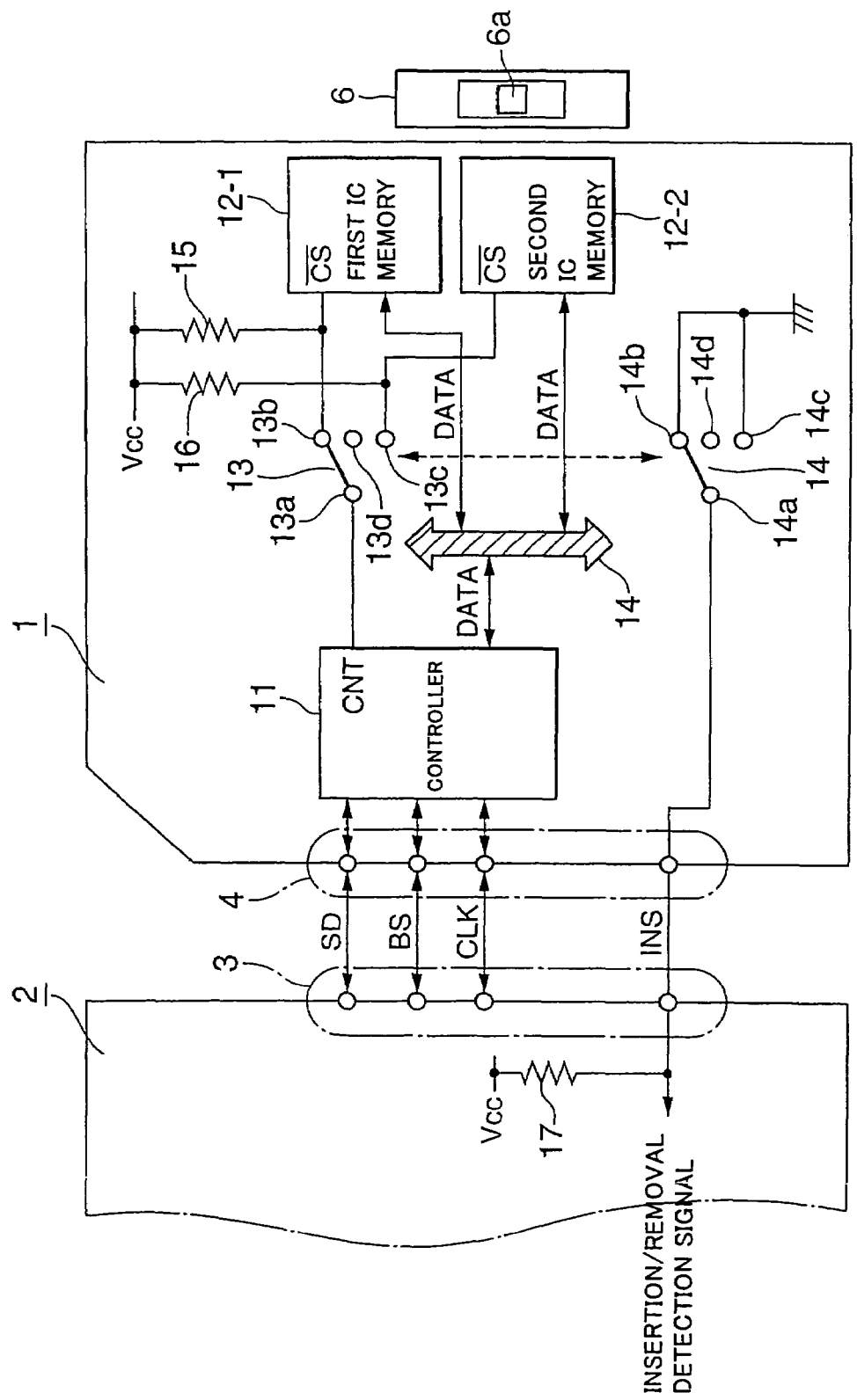
FIG. 4 is a block diagram illustrating the inner configuration of the memory card.

FIG. 4 shows the internal configuration of the memory card 1 according to the present invention.

As FIG. 4 depicts, the connection terminal unit 4 of the memory card 1 includes a serial data terminal SD, a bus state terminal BS, a clock terminal CLK and an insertion/removal detecting terminal INS. Similarly, the connection terminal unit of the host apparatus 2 has a serial data terminal SD, a bus state terminal BS, a clock signal terminal CLK and an insertion/removal detecting terminal INS. The terminals SD, BS, CLK and INS of the memory card 1 are connected to the terminals SD, BS, CLK and INS of the host apparatus 2 when the memory card 1 is inserted into the host apparatus 2. Then, serial data read from, or to be stored into, any IC memory incorporated in the memory card 1 is transferred via the serial data terminals SD. Control data is transferred via the serial data terminals SD, too. Via the bus state terminals BS, the bus state signal representing the state of the serial data transferred via the serial data terminals SD is transferred between the memory card 1 and the host apparatus 2. Via the clock terminals CLK, a clock signal defining the clock timing of the serial data transferred via the serial data terminals SD is transmitted.

The insertion/removal detecting terminals INS are provided so that the host apparatus 2 may determine whether the memory card 1 has been inserted into it. How the host apparatus 2 determine the insertion or removal of the card 1 will be described later in detail.

The connection terminal unit 4 has a power-supply terminal VCC and a ground terminal VSS (not shown). The power-supply terminal VCC is a terminal for supplying power from the host apparatus 2 to the memory card 1. The ground terminal VSS is a terminal for setting the memory card 1 and the host apparatus 2 at the same ground level while the memory card 1 remains inserted in the host apparatus 2.

The memory card 1 incorporates a controller 11, a first IC memory 12-1, a second IC memory 12-2, a first switch 13 and a second switch 14.

The controller 11 supplies and receives the serial data, bus state signal and clock signal to and from the host apparatus 2 via the serial data terminals SD, bus state terminals BS and clock terminals CLK while the memory card 1 remains inserted in the host apparatus 2. In accordance with the serial data (actual data and control data) supplied from the host apparatus 2, the controller 11 controls the writing and reading of data into and from the first IC memory 12-1 and second IC memory 12-2. The controller 11 has a control terminal CNT, from which a memory control signal is output. The memory control signal represents the timing of writing and reading data into and from the IC memories. The controller 11 sets the memory control signal at low level to write and read data into and from the IC memories 12-1 and 12-2. It sets the memory control signal at high level to stop the writing and reading of data into and from the IC memories 12-1 and 12-2.

The first IC memory 12-1 and the second IC memory 12-2 are nonvolatile semiconductor memories such as NAND flash memories or the like. The first IC memory 12-1 and the second IC memory 12-2 are devices (ICs) that are independent of each other. A bus 14 (address bus, data bus and control bus) connects the first IC memory 12-1 and second IC memory 12-2 to the controller 11.

The first IC memory 12-1 and second IC memory 12-2 have a chip select terminal CS each. While the signals (chip select signals) supplied to the chip select terminals remain at low level, data can be written from the controller 11 into the IC memories 12-1 and 12-2 and read from the IC memories 12-1 and 12-2 to the controller 11. While these signals remain at high level, no data can be written from the controller 11 into the IC memory 12-1 or 12-2, or read from the IC memory 12-1 or 12-2 to the controller 11.

The first switch 13 is operated when the user operates the slide switch 6 that is provided outside the memory card 1. The first switch 13 has a fixed contact 13*a* and three movable contacts 13*b*, 13*c* and 13*d*. The three movable contacts 13*b*, 13c and 13d sequentially contact the fixed contact 13a as the user slides the movable part 6a of the slide switch 6. The fixed contact 13a is connected to the control terminal CNT of the controller 11. The first movable contact 13b is connected to the chip select terminal CS of the first IC memory 12-1 and to the power-supply terminal VCC by the first pull-up resistor 15. The second movable contact 13c is connected to the chip select terminal CS of the second IC memory 12-2 and to the power-supply terminal VCC by the second pull-up resistor 16. The third movable contact 13d is connected no terminals; it remains open.

In the first switch 13 thus configured, the first movable contact 13b contacts the fixed contact 13a when the movable part 6a of the slide switch 6 is moved to one end of the switch 6. When the movable part 6a is moved to the other end of the switch 6, the second movable contact 13c contacts the fixed contact 13a. When the movable part 6a is moved to the midpoint on the switch 6, the third movable contact 13d contacts the fixed contact 13a.

Hence, while the movable part 6a of the slide switch 6 stays at the one end of the switch 6, the controller 11 keeps supplying the memory control signal to the chip select terminal CS of the first IC memory 12-1, and a high-level signal to the chip select terminal CS of the second IC memory 12-2. That is, as long as the movable part 6a of the slide switch 6 remains at the one end of the switch 6, data can be written and read into and from the first IC memory 12-1 only.

While the movable part 6a of the slide switch 6 stays at the other end of the switch 6, the controller 11 keeps supplying the memory control signal to the chip select terminal CS of the second IC memory 12-2, and a high-level signal to the chip select terminal CS of the first IC memory 12-1. In other words, as long as the movable part 6a of the slide switch 6 remains at the other end of the switch 6, data can be written and read into and from the second IC memory 12-2 only.

While the movable part 6a of the slide switch 6 stays at the midpoint on the switch 6, the controller 11 keeps supplying a high-level signal to the chip select terminals CS of the IC memories 12-1 and 12-2. Namely, as long as the movable part 6a of the slide switch 6 remains at the midpoint on the switch 6, data can be written and read into and from neither the first IC memory 12-1 nor the second IC memory 12-2.

As can be seen from the above, the first switch 13 is operated as the user operates the slide switch 6, to select either the first IC memory 12-1 or the second IC memory 12-2, or select neither the first IC memory 12-1 nor the second IC memory 12-2.

The second switch 14 works when the user operates the slide switch 6 that is provided on the housing of the memory card 1. The second switch 14 is identical to the first switch 13 in terms of contact configuration. To be more specific, the second switch 14 has a fixed contact 14a and three movable contacts 14b, 14c and 14d. The three movable contacts 14b, 14c and 14d sequentially contact the fixed contact 14a as the user slides the movable part 6a of the slide switch 6. The fixed contact 14a is connected to the insertion/removal detecting terminal INS. The first movable contact 14b is connected to the ground. The second movable contact 14c is connected to the ground, too. The third movable contact 14d is connected no terminals; it remains open.

In the second switch 14 thus configured, the first movable contact 14b contacts the fixed contact 14a when the movable part 6a of the slide switch 6 is moved to one end of the switch 6. When the movable part 6a is moved to the other end of the switch 6, the second movable contact 14c contacts the fixed contact 14a. When the movable part 6a is moved to the midpoint on the switch 6, the third movable contact 14d contacts the fixed contact 14a.

Therefore, while the movable part 6a of the slide switch 6 stays at the one end of the switch 6, the second switch 14 connects the insertion/removal detecting terminal INS to the ground. While the movable part 6a of the slide switch 6 stays at the other end of the switch 6, the second switch 14 connects the insertion/removal detecting terminal INS to the ground, too. While the movable part 6a of the slide switch 6 stays at the midpoint on the switch 6, the switch 14 opens the insertion/removal detecting terminal INS.

How the host apparatus 2 detects the insertion and removal of the IC card will be explained.

The controller provided in the host apparatus 2 monitors the voltage level of the insertion/removal detecting terminal INS. From the voltage level monitored, it determines that the memory card 1 is inserted so that data may be written and read, or that the memory card 1 is not inserted so that no data can be written or read.

As FIG. 4 shows, the insertion/removal detecting terminal INS of the host apparatus 2 is pulled up to the power-supply voltage VCC by a pull-up resistor 17. The insertion/removal detecting terminal INS of the host apparatus 2 is therefore set at high voltage if the memory card 1 is not inserted in the host apparatus 2. When the memory card 1 is inserted and the insertion/removal detecting terminal INS of the memory card 1 is connected to the ground, the voltage on the terminal INS of the host apparatus 2 falls to low level. Thus, the host apparatus 2 can determine whether the memory card 1 is inserted into it or removed from it, on the basis of the voltage on the insertion/removal detecting terminal INS, if the card 1 is inserted into or removed from the apparatus 2 while the insertion/removal detecting terminal INS of the memory card 1 remains connected to the ground.

The controller provided in the host apparatus 2 performs the mounting and de-mounting of the memory card 1 after it determines that the memory card 1 is inserted. More specifically, the controller incorporates the file system of the memory card 1 into the operation system when the voltage on the insertion/removal detecting terminal INS changes from high level to low level. Once the file system has been incorporated into the operation system, the memory card 1 is recognized as an external memory device for the host apparatus 2. When the voltage on the insertion/removal detecting terminal INS changes from low level to high level, the controller in the host apparatus 2 performs the de-mounting of the memory card 1, or removing the file system of the memory card 1 from the operation system of the host apparatus 2. The memory card 1 may be removed from the apparatus 2 while the data is being written into the memory card 1. In this case, the host apparatus 2 performs a back-up process on the data being read.

As described above, the voltage on the insertion/removal detecting terminal INS is monitored and processes are carried in the host apparatus 2, as the memory card 1 is inserted into and removed from the host apparatus 2.

The second switch 14 changes the connection state of the insertion/removal detecting terminal INS in accordance with the position to which the movable part 6a of the slide switch 6 has been moved.

The second switch 14 connects the insertion/removal detecting terminal INS to the ground as long as the movable part 6a of the slide switch 6 remains at the one end of the switch 6. In this case, the first switch 13 selects the first IC memory 12-1. Thus, when the memory card 1 is inserted into the host apparatus 2, with the movable part 6a staying at the one end the slide switch 6, it is detected that the card 1 is so inserted, and data can be written and read into and from the first IC memory 12-1.

The second switch 14 connects the insertion/removal detecting terminal INS to the ground as long as the movable part 6*a* of the slide switch 6 remains at the other end of the switch 6, too. In this case, the first switch 13 selects the second IC memory 12-2. Thus, when the memory card 1 is inserted into the host apparatus 2, with the movable part 6*a* staying at the other end of the slide switch 6, it is detected that the card 1 is so inserted, and data can be written and read into and from the second IC memory 12-2.

The second switch 14 keeps the insertion/removal detecting terminal INS open, while the movable part 6*a* of the slide switch 6 remains at the midpoint on the switch 6. In this case, the first switch 13 selects neither the first IC memory 12-1 nor the second IC memory 12-2. When the memory card 1 is inserted into the host apparatus 2, with the movable part 6*a* held at the midpoint on the slide switch 6, the memory card 1 is detected as if not inserted into the host apparatus 2.

The slide switch 6 can be operated by the user even after the memory card 1 has been inserted into the host apparatus 2. More precisely, the movable part 6*a* can be moved from one end of the switch 6 to the other end thereof, and vice versa. Therefore, the IC memory into and from which data should be written and read can be switched from the first IC memory 12-1 to the second IC memory 12-2, and vice versa.

When the movable part 6*a* is moved from one end of the slide switch 6 to the other end thereof, or vice versa, it passes the midpoint on the slide switch 6, temporarily opening the insertion/removal detecting terminal INS. Namely, whenever the movable part 6*a* is moved between the ends of the slide switch 6, the insertion/removal detecting terminal INS is disconnected from the ground and then connected the ground again.

Hence, it is possible to mount and de-mount the memory card 1 on and from the host apparatus 2, while it remains inserted in the host apparatus 2. That is, the slide switch 6 is operated while the memory card 1 remains in the host apparatus 2, temporarily de-mount the memory card 1 from the host apparatus 2 and then mount the memory card 1 on the host apparatus 2.

When the slide switch 6 is operated to switch the IC memory while the memory card 1 remains in the host apparatus 2, the host apparatus 2 determines that the memory card 1 is temporarily pulled out. Therefore, the operating IC memory can be switched from one to the other, without destroying the data stored in it.

Figure 5:
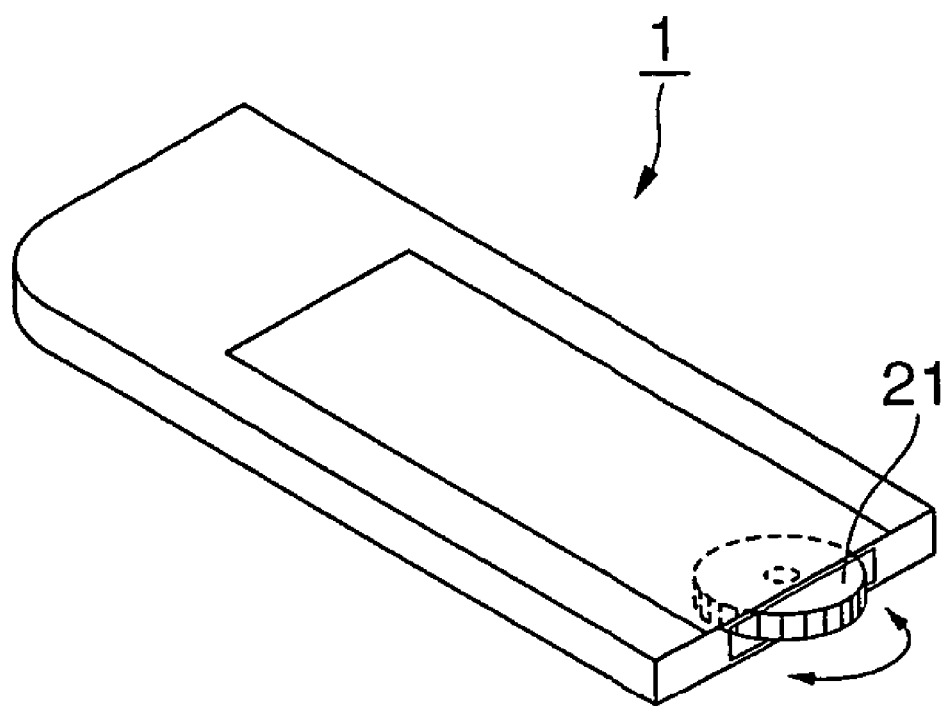
FIG. 5 is a perspective view showing a memory card according to this invention, which has a rotary switch.
Figure 6:
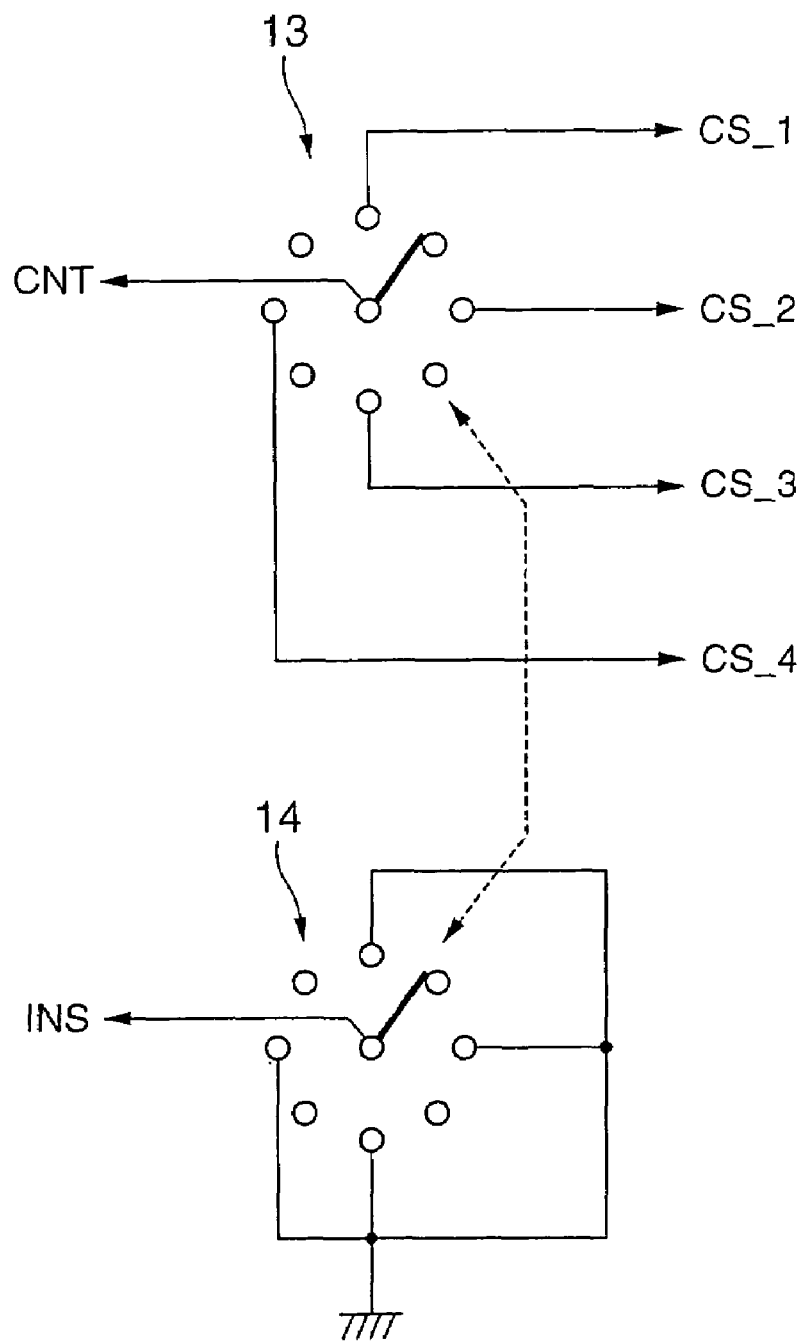
FIG. 6 is a diagram illustrating the structure of the rotary switch provided on the memory card.

As indicated above, the memory card 1 incorporates two IC memories. Instead, the memory card 1 can have three or more IC memories. The greater the number of IC memories, the more complex the operation that the user needs to perform on the slide switch 6. In view of this, it is desirable to replace the slide switch 6 with a rotary switch 21 as is illustrated in FIG. 5. When the rotary switch 21 is operated, the first switch 13 and the second switch 14 work in the same way as the slide switch 6 is operated. That is, as shown in FIG. 6, the second switch 14 connects the insertion/removal detecting terminal INS to the ground while the first switch 13 keeps selecting any one of the IC memories. As the memory is switched to any other IC memory, the second switch 14 temporarily opens the insertion/removal detecting terminal INS.

Figure 7:
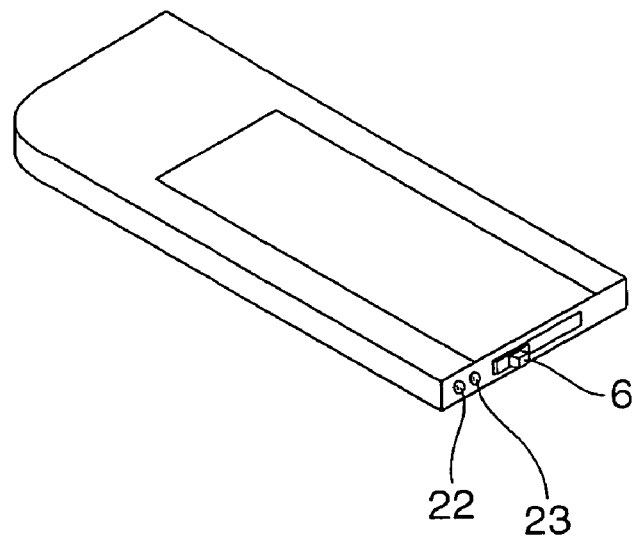
FIG. 7 is a perspective view illustrating memory card provided with a display unit.
Figure 8:
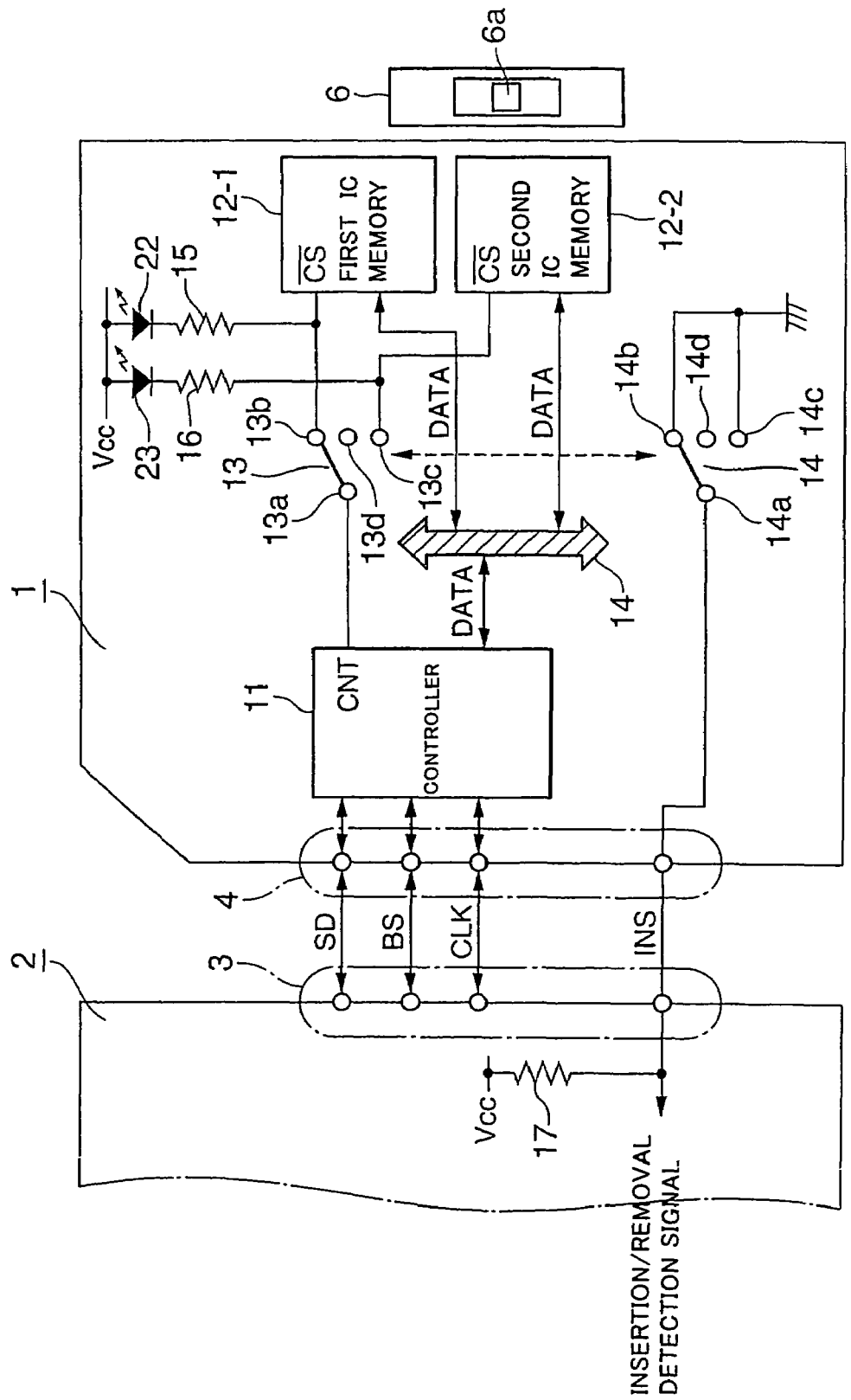
FIG. 8 is a block diagram depicting the inner configuration of the memory card that has the display unit.

The memory card 1 described above may have a display unit that shows the user which IC memory has been selected. The display unit should be so positioned that the user can see the information that the unit displays. As shown in FIG. 7, the display unit is composed of two light-emitting diodes 22 and 23. The diodes 22 and 23 are provided on one end of the card 1 and thus face away from the connection terminal unit that are provided on the other end of the card 1. As FIG. 8 depicts, the first light-emitting diode 22 is connected in series to the first pull-up resistor 15, and the second light-emitting diode 23 is connected in series to the second pull-up resistor 16. Thus, the first light-emitting diode 22 emits light while the first IC memory 12-1 is selected, and the second light-emitting diode 23 emits light while the second IC memory 12-2 is selected.

When the user operates the switch, switching one IC memory to another, the memory card 1 inserted in the host apparatus 2 can make the host apparatus 2 to recognize the IC memories as independent devices and can show the user which IC memory has been selected because it has a display unit.

Figure 9:
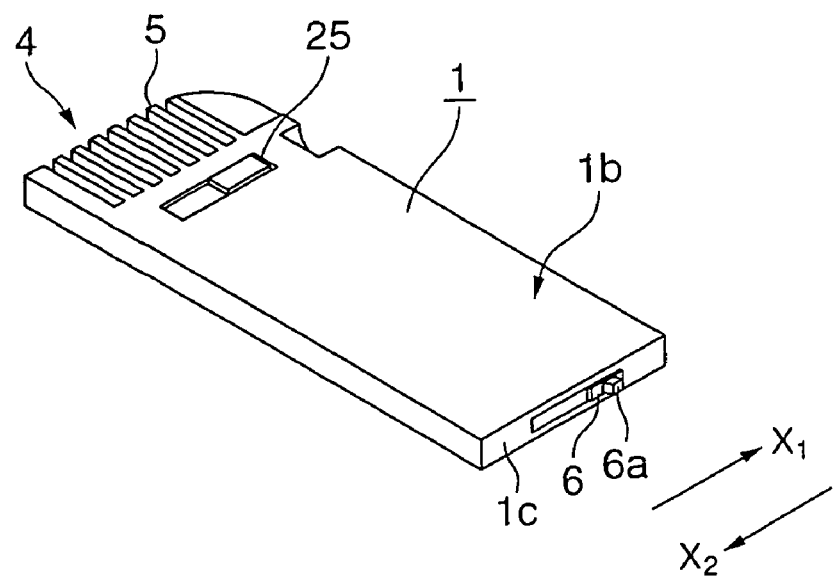
FIG. 9 is a perspective view showing a memory card of this invention, as viewed from the reverse surface, the memory card having an erasure-preventing switch.

The memory card 1 may have an erasure-preventing switch. This switch is operated to prohibit or allow the writing of data into the first IC memory 12-1 and second IC memory 12-2. When the erasure-preventing switch is operated, it generates a selection signal. The selection signal is supplied to the controller 11. The controller 11 prohibits or allows the writing of data into the first IC memory 12-1 and second IC memory 12-2, in accordance with the selection signal. As FIG. 9 shows, the erasure-preventing switch has an operation part 25. The operation part 25 is provided on the reverse surface 1*b* of the housing and located near the connection terminal unit 4. Lying on the reverse surface 1*b*, the operation part 25 cannot be operated by the user while the memory card 1 remains inserted in the host apparatus 2.

Another type of a memory card according to the present invention will be described.

The components of the memory card of this type, which are identical to those of the memory card 1 described above, will be designated at the same reference numerals and will not described in detail.

Figure 10:
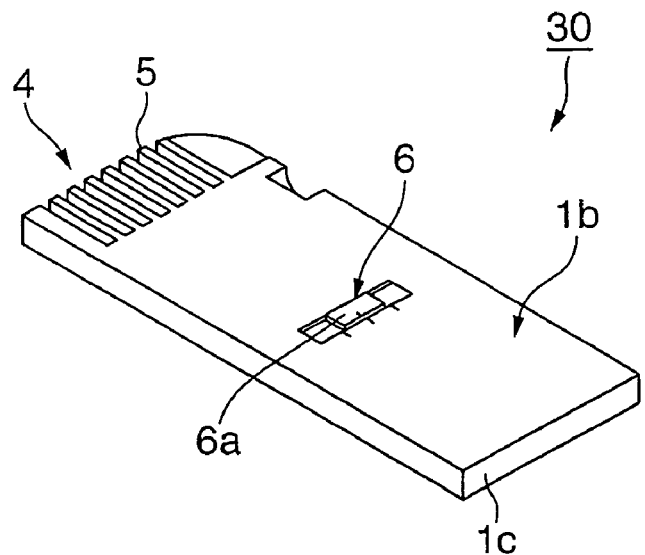
FIG. 10 is a perspective view showing another type of a memory card according to the invention, as viewed from the reverse surface.

FIG. 10 is a perspective view showing the memory card 30 of the other type according to the invention, as viewed from the reverse surface.

Like the memory card 1 described above, the memory card 30 incorporates nonvolatile semiconductor memories (IC memories) and can therefore store various kinds of digital data. This memory card 30 is used as an external storage medium in the host apparatus 2. The memory card 30 is used after inserted into the host apparatus 2, through the insertion/removal port 3 of the apparatus 2. The memory card 30 can be manually inserted and removed into and from the host apparatus 2. Since the memory card 30 can be inserted into any other host apparatus 2, it can be used to transfer data between different host apparatuses.

The memory card 30 is shaped like a rectangular thin plate and has an obverse surface 1*a* and a reverse surface 1*b*. It is identical in configuration to the memory card 1 described above.

However, the memory card 30 is different from the memory card 1 in terms of the position of the slide switch 6 that is operated to switch the operating memory from one IC memory to another. That is, the slide switch 6 lies at almost the center part of the reverse surface 1*b*. Since the slide switch 6 is provided on the reverse surface 1*b*, the user can access to the switch 6 while the card 30 remains inserted in the apparatus 2.

Figure 11:
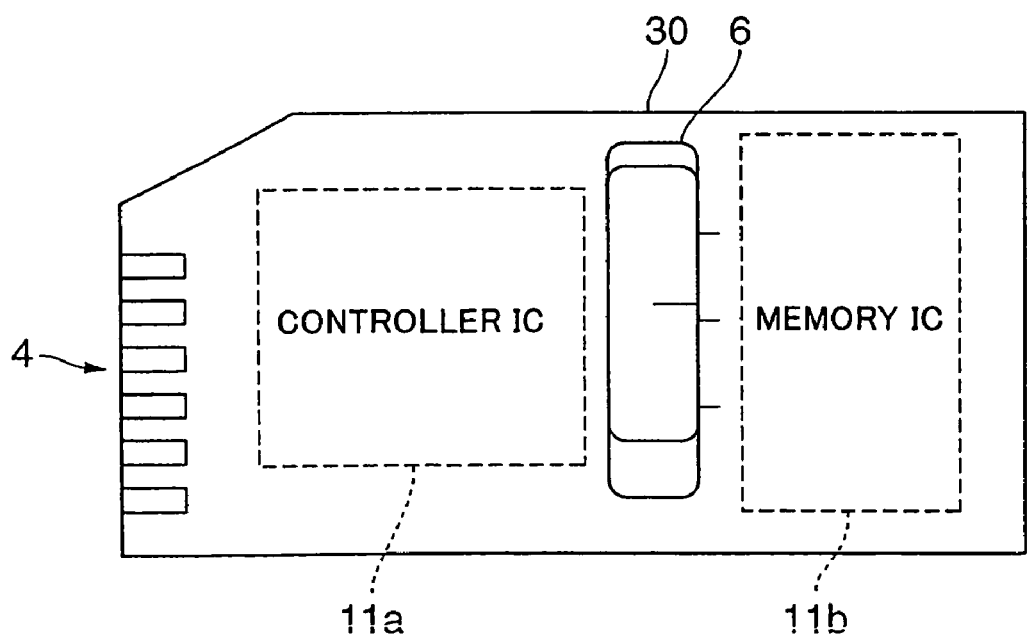
FIG. 11 is a bottom view of the memory card shown in FIG. 10, representing the position of the slide switch that this memory card has.

The memory card 30 incorporates an IC 11*a* used as controller 11, and IC memories 11*b*. As FIG. 11 shows, the slide switch 6 is located between the IC 11*a* (controller 11) and the IC memories 11*b*. Since the slide switch 6 is so located, the distance between the slide switch 6 and the changeover switch incorporated in the card can be shorter than otherwise. This renders it easy to manufacture the memory card 30.

Figure 12:
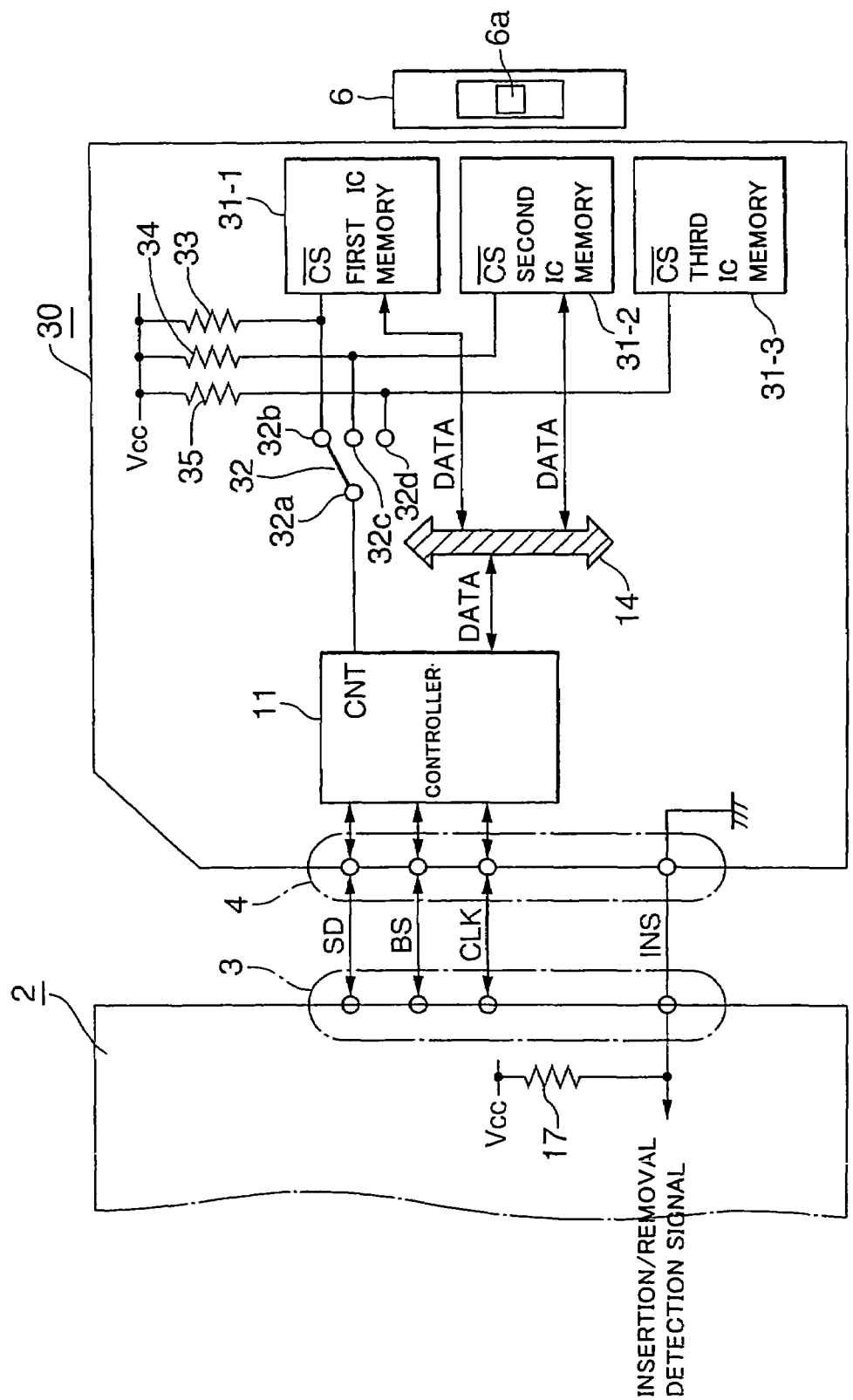
FIG. 12 is a block diagram displaying the inner configuration of another type of a memory card according to the present invention.

FIG. 12 is a block diagram displaying the inner configuration of the memory card 30.

The memory card 30 has an insertion/removal detecting terminals INS, which is provided so that the host apparatus 2 may determine whether the memory card 30 has been inserted into it. In the memory card 30 that is the second embodiment of the invention, the insertion/removal detecting terminals INS is connected to the ground.

The memory card 30 incorporates the controller 11, first IC memory 31-1, second IC memory 31-2, third IC memory 31-3 and memory-changeover switch 32.

The controller 11 supplies and receives serial data, a bus state signal and a clock signal to and from the host apparatus 2 via the serial data terminal SD, bus state terminal BS and clock terminal CLK while the memory card 30 remains inserted in the host apparatus 2. In accordance with the serial data, i.e., actual data and control data, supplied from the host apparatus 2, the controller 11 controls the writing and reading of data into and from the first IC memory 31-1, second IC memory 31-2 and third IC memory 31-3. The controller 11 has a control terminal CNT, from which a memory control signal is output. The memory control signal represents the timing of writing and reading data into and from the IC memories. The controller 11 sets the memory control signal at low level to write and read data into and from the IC memories 31-1, 31-2 and 31-3. It sets the memory control signal at high level to stop the writing and reading of data into and from the IC memories 31-1, 31-2 and 31-3.

The first IC memory 31-1, second IC memory 31-2 and third IC memory 31-3 are nonvolatile semiconductor memories such as NAND flash memories or the like. The first IC memory 31-1, second IC memory 31-2 and third IC memory 31-3 are devices (ICs) that are independent of each other. A bus 14 (address bus, data bus and control bus) connects the first IC memory 31-1, second IC memory 31-2 and third IC memory 31-3 to the controller 11.

The first IC memory 31-1, second IC memory 31-2 and third IC memory 31-3 have a chip select terminal CS each. While the signals (chip select signals) supplied to the chip select terminals remain at low level, data can be written from the controller 11 into the first IC memory 31-1, second IC memory 31-2 and third IC memory 31-3 and read from the first IC memory 31-1, second IC memory 31-2 and third IC memory 31-3 to the controller 11. While these signals remain at high level, no data can be written from the controller 11 into the IC memories 31-1, 31-2 or 31-3 or read from the IC memories 31-1, 31-2 or 31-3 to the controller 11.

The memory-changeover switch 32 works when the user operates the slide switch 6 that is provided on the housing of the memory card 30. The memory-changeover switch 32 has a fixed contact 32a and three movable contacts 32b, 32c and 32d. The three movable contacts 32b, 32c and 32d sequentially contact the fixed contact 32a as the user slides the movable part 6a of the slide switch 6. The fixed contact 32a is connected to the control terminal CNT of the controller 11. The first movable contact 32b is connected to the chip select terminal CS of the first IC memory 31-1 and to the power-supply terminal VCC by the first pull-up resistor 33. The second movable contact 32c is connected to the chip select terminal CS of the second IC memory 31-2 and to the power-supply terminal VCC by the second pull-up resistor 34. The third movable contact 32d is connected to the chip select terminal CS of the third IC memory 31-3 and to the power-supply terminal VCC by the third pull-up resistor 35.

In the memory-changeover switch 32 thus configured, the first movable contact 32b contacts the fixed contact 32a when the movable part 6a of the slide switch 6 is moved to one end of the switch 6. When the movable part 6a is moved to the other end of the switch 6, the third movable contact 32d contacts the fixed contact 32a. When the movable part 6a is moved to the midpoint on the switch 6, the second movable contact 32c contacts the fixed contact 32a.

Hence, while the movable part 6a of the slide switch 6 stays at the one end of the switch 6, the controller 11 keeps supplying the memory control signal to the chip select terminal CS of the first IC memory 31-1, and a high-level signal to the chip select terminals CS of the second and third IC memories 31-2 and 31-3. That is, as long as the movable part 6a of the slide switch 6 remains at the one end of the switch 6, data can be written and read into and from the first IC memory 31-1 only.

While the movable part 6a of the slide switch 6 stays at the midpoint on the switch 6, the controller 11 keeps supplying a memory control signal to the chip select terminals CS of the second IC memory 31-2 and a high-level signal to the chip select terminals CS of the first and third IC memories 31-1 and 31-3. Namely, as long as the movable part 6a of the slide switch 6 remains at the midpoint on the switch 6, data can be written and read into and from the second IC memory 31-2 only.

While the movable part 6a of the slide switch 6 stays at the other end of the switch 6, the controller 11 keeps supplying the memory control signal to the chip select terminal CS of the third IC memory 31-3, and a high-level signal to the chip select terminals CS of the first and second IC memories 31-1 and 32-2. In other words, as long as the movable part 6a of the slide switch 6 remains at the other end of the switch 6, data can be written and read into and from the third IC memory 31-3 only.

As can be understood from the above, the memory-changeover switch 32 works as the user operates the slide switch 6, to select one of the three IC memories that are provided in the memory card 30.

As mentioned above, the slide switch 6 for switching the operating memory from one IC memory to another is provided on the reverse surface 1b of the memory card 30 of the other type according to this invention. Since the slide switch 6 is so provided, the user cannot access to it from outside the host apparatus 2 as long as the memory card 30 remains inserted in the host apparatus 2. The memory card 30 incorporates a plurality of flash memories. Any one of these memories can be selected and used by operating the changeover switch provided outside the memory card 30. Once the memory card 30 has been inserted into the host apparatus 2, the user cannot operate the changeover switch. This prevents the destruction of the data stored in the flash memories.

Figure 13:
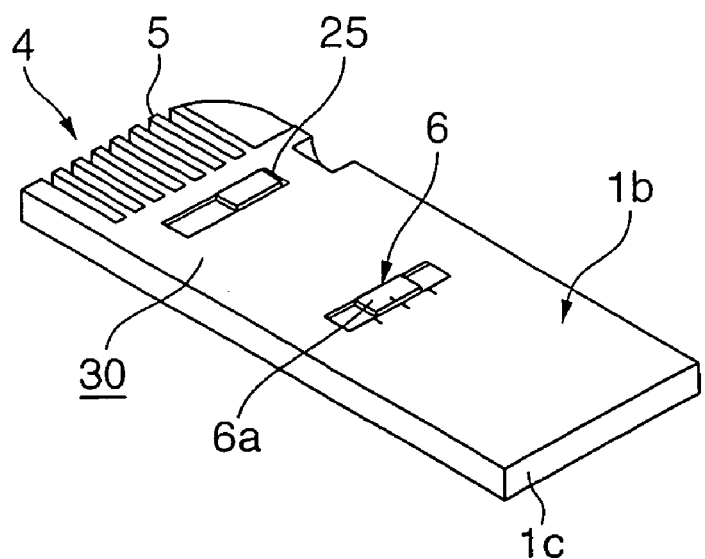
FIG. 13 is a perspective view of a memory card, as viewed from the reverse surface, the card having an erasure-preventing switch.

The memory card 30 that is the second embodiment may have an erasure-preventing switch. This switch is operated to prohibit or allow the writing of data into the first IC memory 31-1, second IC memory 31-2 and third IC memory 31-3. When the erasure-preventing switch is operated, it generates a selection signal. The selection signal is supplied to the controller 11. The controller 11 prohibits or allows the writing of data into the first IC memory 31-1, second IC memory 31-2 and third IC memory 31-3, in accordance with the selection signal. As FIG. 13 depicts, the erasure-preventing switch has an operation part 25. The operation part 25 is provided on the reverse surface 1b of the housing and located near the connection terminal unit 4. Lying on the reverse surface 1b, the operation part 25 cannot be operated by the user while the memory card 30 remains inserted in the host apparatus 2.

Figure 14:
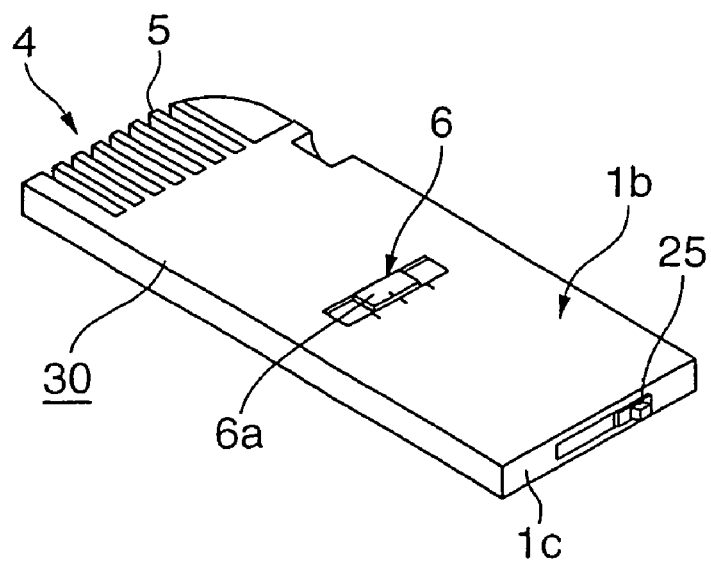
FIG. 14 is a perspective view of a memory card, as viewed from the reverse surface, the card having an erasure-preventing switch on one side.

As shown in FIG. 14, the erasure-preventing switch may have its operation part 25 provided on that end 1c of the card 30 which faces away from the end at which the connection terminal unit 4 is provided. The end 1c is exposed through the insertion/removal port 3 of the host apparatus 2 while the memory card 30 remains inserted in the host apparatus 2. The user can therefore operate the erasure-preventing switch from outside the host apparatus 2, even while the memory card 30 is kept inserted in the host apparatus 2.

Figure 15:
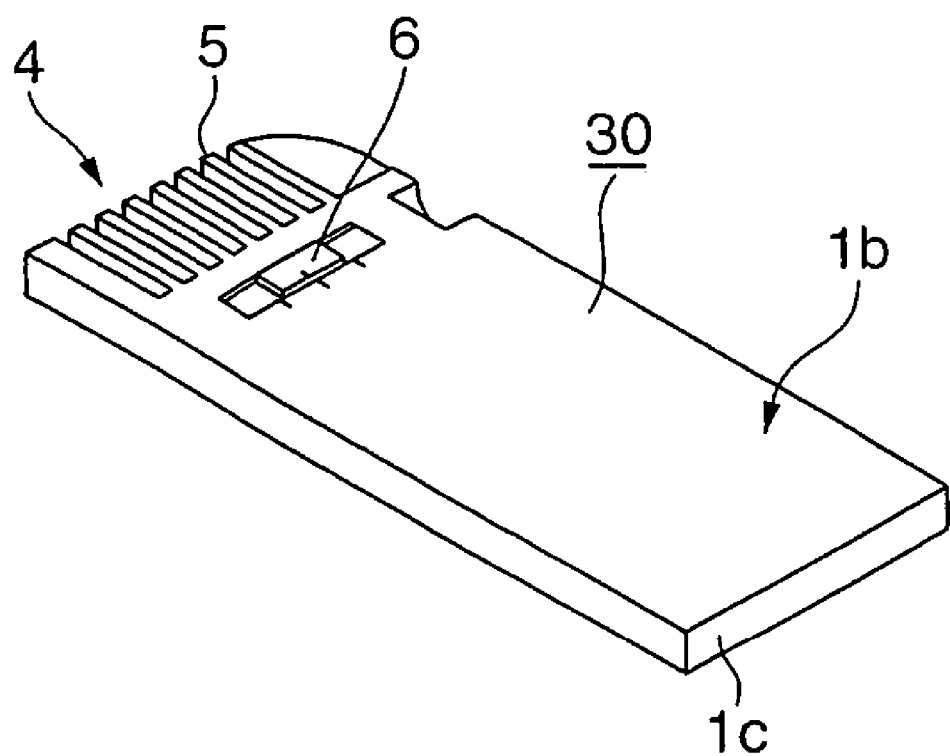
FIG. 15 is a perspective view of a memory card, as viewed from the reverse surface, this card having an erasure-preventing switch at a different position.

In the memory card 30 of the other type according to this invention, the slide switch 6 may be located near the connection terminal unit 4 that is provided on the reverse surface 1b, as is illustrated in FIG. 15. A memory card called "memory stick" (trademark) has been proposed, which is almost identical in outer shape to the memory card 30 according to the second embodiment. This conventional memory card has an erasure-preventing switch, the operation unit of which is located near the connection terminal unit provided on the reverse surface 1b of the housing. The slide switch 6 of the memory card 30 shown in FIG. 15 takes the same position as its counterpart of the conventional memory card. The memory card 30 can therefore be identical to the conventional memory card, in not only outer shape but also switch shape. Thus, the memory card 30 can be manufactured by using the same production line as the conventional memory card. This can reduce the increase in manufacturing cost, which results from the design changes.

As described above, the IC memories incorporated in the memory card 30 are, fore example, NAND flash memories. Memories of any other type can be used instead, only if they can hold data even after the memory card 30 is removed from the host apparatus 2. The memories provided in the memory card 30 are of the same type. Nonetheless, they can be different types. For example, some of the memories may be flash memories, and the other memories may be ROMs. Further, the memory card 30 may incorporate RAMs as memory means, provided that the card 30 contains batteries.

A memory card of still another type, according to the present invention will be described.

The components of the memory card of this type, which are identical to those of the memory card 1 described above, will be designated at the same reference numerals and will not described in detail.

Figure 16:
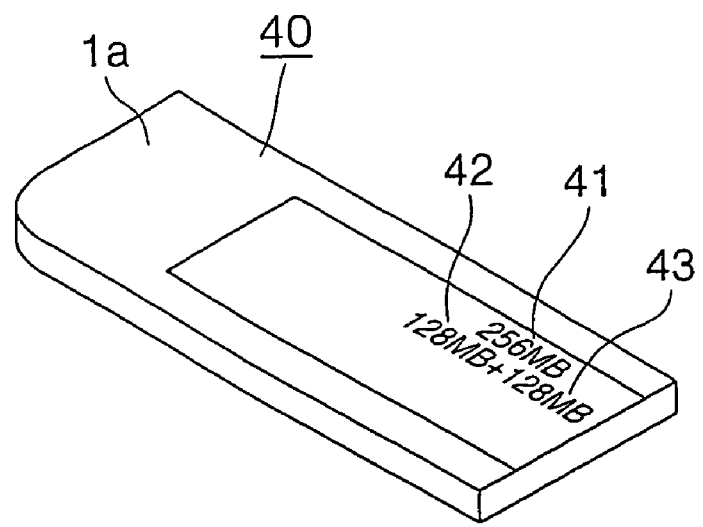
FIG. 16 is a perspective view of another type of a memory card according to the invention, as viewed from the obverse surface.
Figure 17:
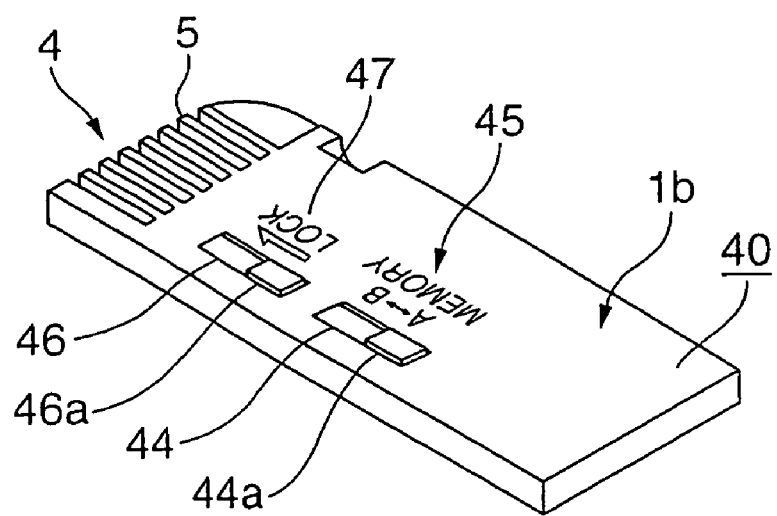
FIG. 17 is a perspective view of still another type of a memory card according to the invention, as viewed from the reverse surface.

FIG. 16 is a perspective view of the memory card 40 of this type, as viewed from the obverse surface. FIG. 17 is a perspective view of the memory card 40, as viewed from the reverse surface.

Like the memory card 1 described above, the memory card 40 incorporates nonvolatile semiconductor memories (IC memories) and can therefore store various kinds of digital data. This memory card 40 functions as an external storage medium in the host apparatus 2. The memory card 40 is used after inserted into the host apparatus 2, through the insertion/removal port 3 of the apparatus 2. The memory card 40 can be manually inserted into and removed from the host apparatus 2. Since the memory card 40 can be inserted into any other host apparatus 2, it can be used to transfer data between different host apparatuses.

The memory card 40 is shaped like a rectangular thin plate and has an obverse surface 1a and a reverse surface 1b. It is identical in configuration to the memory card 1 described above.

The memory card 40 incorporates two IC memories, i.e., the first IC memory 12-1 and the second IC memory 12-2. In the memory card 40, one of the two IC memories, e.g., first IC memory 12-1, is defined as "memory A," and the other memory, i.e., second IC memory 12-2, is defined as "memory B."

Three marks 41, 42 and 43 are printed on the obverse surface 1a of the memory card 40. The first mark 41 indicates the sum of the storage capacities of the memories A and B. The second mark 42 indicates the storage capacity of the memory A. The third mark 43 indicates the storage capacity of the memory B. These marks help the user to recognize the storage capacity of each IC memory. Such marks showing the storage capacities of the IC memories may be printed on the memory card 1 and the memory card 30, both described above.

The memory card 40 has a first slide switch 44 of two-point changeover type, which is provided on the reverse surface 1b. The first slide switch 44 has a movable part 44a that the user can move in the lengthwise direction of the reverse surface 1b. The first slide switch 44 is arranged at a part of the reverse surface 1b, which is almost central in the lengthwise direction of the reverse surface 1b. It is located close to one long side of the reverse surface 1b.

When the movable part 44a is moved to one end of the first slide switch 44, for example, that end which faces away from the connection terminal unit 4, the memory A is selected. When the movable part 44a is moved to the other end of the first slide switch 44, which is near the connection terminal unit 4, the memory B is selected.

A memory selection mark 45 is printed on the reverse surface 1b of the memory card 40, close to the first slide switch 44. The mark 45 shows in which direction the user needs to move the movable part 44a to select the memory A or the memory B. More precisely, the memory selection mark 45 has two letters, "A" and "B," printed near the ends of the first slide switch 44, respectively. Such a memory selection mark may be printed on the memory cards 1 and 40 described above.

The memory card 40 has a second slide switch 46 of two-point changeover type, which is provided on the reverse surface 1b, too. The second slide switch 46 performs two functions. The first function is to prohibit the writing of data into the IC memories. The second function is to allow the writing of data into the IC memories.

The second slide switch 46 is identical to the first slide switch 44 in size and shape. The second slide switch 46 has a movable part 46a on the reverse surface 1b. The user can move the movable part 46a in the lengthwise direction of the reverse surface 1b. The second slide switch 46 is located between the connection terminal unit 4 and the first slide switch 44. It is positioned at the same distance as the first slide switch 44 forms one long side of the memory card 40.

While the movable part 46a stays at one end of the second slide switch 46, for example, the end away from the connection terminal unit 4, data can be written into the memory card 40. While the movable part 46a stays at the other end of the second slide switch 46, for example, the end close to the connection terminal unit 4, no data can be written into the memory card 40.

Figure 18:
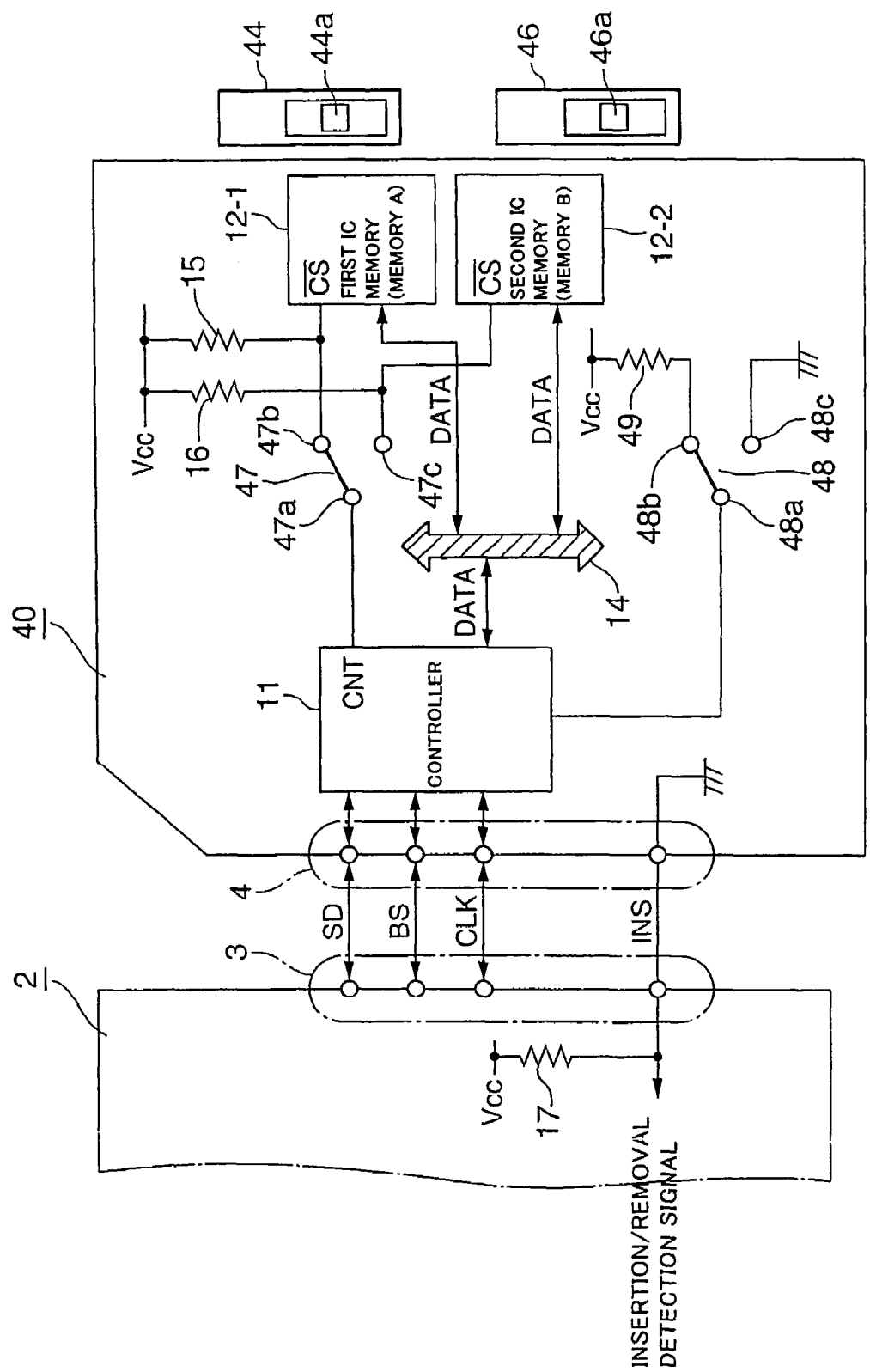
FIG. 18 is a block diagram illustrating the inner configuration of another memory card according to the present invention.

FIG. 18 is a block diagram illustrating the inner configuration of another memory card 40 according to the present invention.

The memory card 40 incorporates a controller 11, a first IC memory 12-1 (memory A), a second IC memory 12-2 (memory B), a memory-changeover switch 47, and an erasure-preventing switch 48.

The memory card 40 has an insertion/removal detecting terminal INS. The insertion/removal detecting terminal INS is connected to the ground.

While the memory card 40 remains inserted in the host apparatus 2, the controller 11 supplies and receives serial data, a bus state signal and a clock signal to and from the host apparatus 2 via the serial data terminal SD, bus state terminal BS and clock terminal CLK. In accordance with the serial data (actual data and control data) supplied from the host apparatus 2, the controller 11 controls the writing and reading of data into and from the first IC memory 12-1 and second IC memory 12-2. The controller 11 has a control terminal CNT, from which a memory control signal is output. The memory control signal represents the timing of writing and reading data into and from the IC memories. The controller 11 sets the memory control signal at low level to write and read data into and from the IC memories 12-1 and 12-2. It sets the memory control signal at high level to stop the writing and reading of data into and from the IC memories 12-1 and 12-2.

The first IC memory 12-1 and the second IC memory 12-2 are nonvolatile semiconductor memories such as NAND flash memories or the like. The first IC memory 12-1 and the second IC memory 12-2 are devices (ICs) that are independent of each other. A bus 14 (address bus, data bus and control bus) connects the first IC memory 12-1 and second IC memory 12-2 to the controller 11.

The first IC memory 12-1 and second IC memory 12-2 have a chip select terminal CS each. While the signals (chip select signals) supplied to the chip select terminals remain at low level, data can be written from the controller 11 into the IC memories 12-1 and 12-2 and read from the IC memories 12-1 and 12-2 to the controller 11. While these signals remain at high level, no data can be written from the controller 11 into the IC memory 12-1 or 12-2, or read from the IC memory 12-1 or 12-2 to the controller 11.

The memory-changeover switch 47 works as the user operates the slide switch 44 provided on the housing of the memory card 40. The memory-changeover switch 47 has a fixed contact 47a and two movable contacts 47b and 47c. The memory-changeover switch 47 operates as the movable part 44a of the first slide switch 44 is moved. That is, either the first movable contact 47b or the second movable contact 74c contacts the fixed contact 47a. The fixed contact 47a is connected to the control terminal CNT of the controller 11. The first movable contact 47b is connected to the chip select terminal CS of the first IC memory 12-1 and to the power-supply terminal VCC by the first pull-up resistor 15. The second movable contact 47c is connected to the chip select terminal CS of the second IC memory 12-2 and to the power-supply terminal VCC by the second pull-up resistor 16.

In the memory-changeover switch 47 thus configured, the first movable contact 47b contacts the fixed contact 47a when the movable part 44a of the first slide switch 44 is moved to one end of the switch 44. When the movable part 44a is moved to the other end of the switch 47, the second movable contact 47c contacts the fixed contact 47a.

Hence, while the movable part 44a of the first slide switch 44 stays at the one end of the switch 44, the controller 11 keeps supplying the memory control signal to the chip select terminal CS of the first IC memory 12-1, and a high-level signal to the chip select terminal CS of the second IC memory 12-2. That is, as long as the movable part 44a remains at the one end of the switch 44, data can be written and read into and from the first IC memory 12-1 only.

While the movable part 44a of the first slide switch 44 stays at the other end of the switch 44, the controller 11 keeps supplying the memory control signal to the chip select terminal CS of the second IC memory 12-2, and a high-level signal to the chip select terminal CS of the first IC memory 12-1. In other words, as long as the movable part 44a of the first slide switch 44 remains at the other end of the switch 44, data can be written and read into and from the second IC memory 12-2 only.

Thus, the memory-changeover switch 47 works as the first slide switch 44 is operated, selecting one of the two IC memories provided in the memory card 40.

The erasure-preventing switch 48 is a switch that works as the second slide switch 46 provided on the housing of the memory card 40 is operated. The erasure-preventing switch 48 has a fixed contact 48a and two movable contacts (i.e., first movable contact 48b and second movable contact 48c). As the movable part 46a of the second slide switch 46 is moved, either the first movable contact 48b or the second movable contact 48c contacts the fixed contact 48a. The fixed contact 48a is connected to the controller 11. The first movable contact 48b is connected by a third pull-up resistor 49 to the power-supply terminal VCC. The second movable contact 48c is connected to the ground.

The first movable contact 48b of the erasure-preventing switch 48 contacts the fixed contact 48a when the movable part 46a of the second slide switch 46 is moved to one end of the switch 46. When the movable part 46a of the second slide switch 46 is moved to the other end of the switch 46, the second movable contact 48c contacts the fixed contact 48a.

Therefore, the erasure-preventing switch 48 can supply a high-level signal to the controller 11 while the movable part 46a of the second slide switch 46 stays at the one end of the switch 46. While the movable part 46a of the second slide switch 46 remains at the other end of the switch 46, the erasure-preventing switch 48 can supply a low-level signal to the controller 11. The controller 11 receives a resister read command that the host apparatus 2 has supplied to determine the state of the memory card 40. This command is written into the register incorporated in the controller 11. The contents of the register are supplied to the host apparatus 2 through a serial-data line. From the contents, the host apparatus 2 determines whether data can be written or not into the memory card 40.

As specified above, the first slide switch 44 for switching the operating memory from one to the other is provided on the reverse surface 1b of the memory card 40 according to this invention. Since the first slide switch 44 lies on the reverse surface 1b, the user cannot access to it as long as the memory card 40 remains in the host apparatus 2. Thus, the user cannot switch one of the flash memories in the card 40, to the other, while the card 40 remains inserted in the host apparatus 2. This prevents destruction of the data stored in the flash memories.

Different security levels may be assigned to the IC memories incorporated in the memory card. For example, the user must input a password to verify himself as authorized to write and read data into the first IC memory, and need not do so to write and read data into and from the second IC memory. In this case, data is stored into the first or second IC memory, in accordance with whether it is private data or public data. For example, personal data is stored in the first IC memory, and business data is stored in the second IC memory. Alternatively, data may be stored into the first or second IC memory, in accordance with the type of the host apparatus 2. More precisely, data is recorded in the first IC memory if the host apparatus 2 is a digital still camera, and in the second IC memory if the host apparatus 2 is a personal computer.

The present invention is not limited to the embodiments described above with reference to the drawings. It is obvious to anyone skilled in the art that various changes, modifications and equivalents can be made, without departing from the scope and spirit of the invention.

INDUSTRIAL APPLICABILITY

A data storage apparatus according to the present invention incorporates a plurality of nonvolatile memories and two switches. The first switch is operated, switching one memory to another, to make the host apparatus recognize the storage region of the memory as an independent device. In this data storage apparatus, the first switch has a movable contact and three contacts. When the movable contact is moved to the first fixed contact, one memory is selected. When the movable contact is moved to the second fixed contact, another memory is selected. When the movable contact is moved to the third fixed contact that lies between the first and second fixed contacts, no memory is selected. The second switch connects a detecting terminal to the ground when the first switch selects any one of the nonvolatile memories, and opens the detecting terminal when the first switch selects none of the nonvolatile memories.

Hence, in the data storage apparatus according to the invention, the switch selects one of the storage regions provided, causing the host apparatus to recognize the storage region, thus selected, as an independent device. In addition, the first switch can be operated while the data storage apparatus remains attached to the host apparatus.

Moreover, in the data storage apparatus according to the invention, the operating memory is switched from one of the nonvolatile memories, to another nonvolatile memory, when the first switch is operated. Thus, the host apparatus can recognize the storage region of each memory as an independent device. Further, the data storage device has a display unit that shows the user which nonvolatile memory has been selected by operating the first switch.

Thus, in the data storage apparatus according to this invention, the operating storage region is switched from one of the regions provided, to another, by operating the switch, so that the host apparatus may recognize the storage regions as independent devices. In addition, the user can recognize the storage region that has been selected by operating the switch, even while the data storage apparatus remains attached to the host apparatus.

The invention claimed is:

1. A data storage apparatus to be removably attached to a host apparatus, comprising:
    a plurality of nonvolatile memories in which no data is erased even after the data storage apparatus is removed from the host apparatus;
    a first switch which has a plurality of contacts, which is configured to be operated by a user to select one of the contacts, and which is configured to select one of the nonvolatile memories which corresponds to the contact selected;
    a second switch which has contacts, one of which is selected when the first switch is operated;
    an interface unit which is configured to supply and receive data to and from the host apparatus while the data storage apparatus remains attached to the host apparatus; and
    a controller which is configured to operate in accordance with data transmitted through the interface unit and which is configured to write and read data into and from one nonvolatile memories that has been selected by operating the first switch,
    wherein the interface unit has a detecting terminal which is configured to make the host apparatus determine that the apparatus is attached to the host apparatus;
    the first switch has a contact configured to select none of the nonvolatile memories, at a midpoint between a contact configured to select one nonvolatile memories and a contact configured to select another nonvolatile memories; and
    the second switch is configured to connect the detecting terminal to ground while the first switch is selecting any one of the nonvolatile memories, and is configured to open the detecting terminal while the first switch is selecting none of the nonvolatile memories.

2. A data storage apparatus according to claim 1, wherein the nonvolatile memories have a selection-signal input unit and is able to store or supply data in accordance with a selection signal supplied to the selection-signal input unit; a bus connects the controller to the plurality of nonvolatile memories; and the first switch supplies the selection signal to one of the nonvolatile memories which corresponds to one contact while the contact remains selected to select the nonvolatile memories and supplies the selection signal to none of the nonvolatile memories while the contact remains unselected.

3. A data storage apparatus according to claim 1, wherein the first switch has an operation part at such a position as to be operated by the user even while the apparatus remains attached to the host apparatus.

4. A data storage apparatus to be removably attached to a host apparatus, comprising:
    a plurality of nonvolatile memories in which no data is erased even after the data storage apparatus is removed from the host apparatus;
    a memory-changeover switch configured to select one of the nonvolatile memories
    an interface unit configured to supply and receive data to and from the host apparatus while the data storage apparatus remains attached to the host apparatus;
    a controller configured to operate in accordance with data transmitted through the interface unit and configured to write and read data into and from one nonvolatile memories that has been selected by operating the memory-changeover switch;
    an output unit configured to output information that the host apparatus displays to inform the nonvolatile memories selected by the memory-changeover switch; and
    a second switch configured to change over a contact as the memory-changeover switch is operated, and in which the memory-changeover switch has a contact configured to select none of the nonvolatile memories, at a midpoint between a contact configured to select one nonvolatile memories and a contact configured to select another nonvolatile memories, and the second switch is configured to connect the detecting terminal to ground while the memory-changeover switch keeps selecting any one of the nonvolatile memories, and is configured to open the detecting terminal while the memory-changeover switch keeps selecting none of the nonvolatile memories.

5. A data storage apparatus according to claim 4, wherein the nonvolatile memories have a selection-signal input unit and is able to store or supply data in accordance with a selection signal supplied to the selection-signal input unit; a bus connects the controller to the plurality of nonvolatile memories; and the memory-changeover switch supplies the selection signal to one of the nonvolatile memories which corresponds to one contact while the contact remains selected to select the nonvolatile memories means, and supplies the selection signal to none of the nonvolatile memories while the contact remains unselected.

6. A data storage apparatus according to claim 4, wherein the memory-changeover switch has an operation part at such a position as to be operated by the user even while the apparatus remains attached to the host apparatus.

7. A data storage apparatus to be removably attached to a host apparatus, comprising:
a plurality of nonvolatile memories in which no data is erased even after the data storage apparatus is removed from the host apparatus;
a memory-changeover switch configured to select one of the nonvolatile memories; and
a controller configured to operate in accordance with data transmitted from the host apparatus through the interface unit and configured to write and read data into and from one nonvolatile memories that has been selected by operating the memory-changeover switch,
wherein the memory-changeover switch has an operation part at such a position as not to be operated by the user while the apparatus remains attached to the host apparatus.

8. A data storage apparatus according to claim 7, which comprises a housing shaped like a thin plate and containing the nonvolatile memories and the controller, and in which the operation part of the memory-changeover switch is provided on a major surface of the housing shaped like a thin plate.

9. A data storage apparatus according to claim 7, wherein the operation part of the memory-changeover switch is located between the nonvolatile memories and the controller.

10. A data storage apparatus according to claim 7, wherein at least three nonvolatile memories are provided, and the operation part of the memory-changeover switch is a slide switch.

11. A data storage apparatus according to claim 7, wherein the plurality of nonvolatile memories includes memory devices of different types.

12. A data storage apparatus according to claim 7, which further comprises an erasure-preventing switch which is configured to be operated to allow and prohibit writing of data into the nonvolatile memories, and in which the controller is configured to write no data despite a write command supplied from the host apparatus, while the erasure-preventing switch is prohibiting the writing of data into the nonvolatile memories, and is configured to write data in accordance with the write command supplied from the host apparatus, while the erasure-preventing switch is allowing the writing of data into the nonvolatile memories.

13. A data storage apparatus to be removably attached to a host apparatus, comprising:
a plurality of nonvolatile memories in which no data is erased even after the data storage apparatus is removed from the host apparatus;
a memory-changeover switch configured to select one of the nonvolatile memories;
an erasure-preventing switch which is configured to be operated to allow and prohibit writing of data into the nonvolatile memories; and
a controller configured to operate in accordance with data transmitted from the host apparatus through an interface unit,
wherein the controller is configured to write and read data into and from one of the nonvolatile memories which has been selected by operating the first memory-changeover switch, is configured to write no data despite a write command supplied from the host apparatus, while the erasure-preventing switch is prohibiting the writing of data into the nonvolatile memories, and is configured to write data in accordance with the write command supplied from the host apparatus, while the erasure-preventing switch is allowing the writing of data into the nonvolatile memories; the memory-changeover switch has an operation part at such a position as not to be operated by the user while the apparatus remains attached to the host apparatus; and the erasure-preventing switch has an operation part at such a position as to be operated by the user even while the apparatus remains attached to the host apparatus.

14. A data storage apparatus to be removably attached to a host apparatus, comprising:
a plurality of nonvolatile memories in which no data is erased even after the data storage apparatus is removed from the host apparatus;
a memory-changeover switch configured to select one of the nonvolatile memories;
an erasure-preventing switch which is configured to be operated to allow and prohibit writing of data into the nonvolatile memories; and
a controller configured to operate in accordance with data transmitted from the host apparatus through an interface unit,
wherein the controller is configured to write and read data into and from one of the nonvolatile memories which has been selected by operating the first memory-changeover switch, is configured to write no data despite a write command supplied from the host apparatus, while the erasure-preventing switch is prohibiting the writing of data into the nonvolatile memories, and is configured to write data in accordance with the write command supplied from the host apparatus, while the erasure-preventing switch is allowing the writing of data into the nonvolatile memories; the memory-changeover switch has an operation part at such a position as to be operated by the user even while the apparatus remains attached to the host apparatus; and the erasure-preventing switch has an operation part at such a position as not to be operated by the user while the apparatus remains attached to the host apparatus.

15. A data storage apparatus to be removably attached to a host apparatus, comprising:
a plurality of nonvolatile memories in which no data is erased even after the data storage apparatus is removed from the host apparatus;
a memory-selecting switch which has a plurality of contacts, which is configured to be operated by a user to select one of the contacts, and which is configured to select one of the nonvolatile memories which corresponds to the contact selected;
an erasure-preventing switch which is configured to be operated to allow and prohibit writing of data into the nonvolatile memories;
an interface unit which is configured to supply and receive data to and from the host apparatus while the data storage apparatus remains attached to the host apparatus; and
a controller which is configured to operate in accordance with data transmitted through the interface unit and which is configured to write and read data into and from one nonvolatile memories that has been selected by operating the memory-selecting switch.

16. A data storage apparatus according to claim 15, wherein a mark indicating the storage capacity of each nonvolatile memories is printed on a housing.

17. A data storage apparatus according to claim 15, wherein each nonvolatile memories is assigned to a name distinguishing the nonvolatile memories from any other nonvolatile memories, and the name is printed on a housing, at a corresponding part of the memory-selecting switch, to which the operation part of the memory-selecting switch is moved to select the nonvolatile memories assigned to the name.

18. A memory card system having a host apparatus and first and second memory cards to be removably attached to the host apparatus, wherein:
   the first memory card and the second memory card are identical in outer shape and have a switch each, each of which has an operation part configured to be operated by a user;
   the second memory card incorporates a plurality of nonvolatile memories in which no data is erased even after the second memory card is removed from the host apparatus;
   the switch of the second memory card is a memory-changeover switch configured to select one of the nonvolatile memories; and
   the switch of the first memory card is an erasure-preventing switch configured to allow and prohibit writing of data into the first memory card.

* * * * *